United States Patent
Dittmann et al.

(10) Patent No.: US 7,406,083 B2
(45) Date of Patent: Jul. 29, 2008

(54) METHOD FOR PRESERVING THE ORDER OF DATA PACKETS PROCESSED ALONG DIFFERENT PROCESSING PATHS

(75) Inventors: Gero Dittmann, Zurich (CH); Laurent Frelechoux, Lausanne (CH); Andreas Herkersdorf, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 10/645,104

(22) Filed: Aug. 21, 2003

(65) Prior Publication Data

US 2004/0042456 A1 Mar. 4, 2004

(30) Foreign Application Priority Data

Aug. 27, 2002 (EP) .................................. 02405724

(51) Int. Cl.
*H04L 12/28* (2006.01)
*H04L 12/56* (2006.01)
*H04L 12/54* (2006.01)
*H04J 3/02* (2006.01)

(52) U.S. Cl. ........................ 370/394; 370/428; 370/542

(58) Field of Classification Search ................ 370/294, 370/292, 392, 394, 428, 464, 542
See application file for complete search history.

(56) References Cited

U.S. PATENT DOCUMENTS

| 6,788,686 | B1 * | 9/2004 | Khotimsky et al. | 370/394 |
|---|---|---|---|---|
| 2003/0108066 | A1 * | 6/2003 | Trippe | 370/474 |
| 2003/0142624 | A1 * | 7/2003 | Chiussi et al. | 370/235 |
| 2003/0169758 | A1 * | 9/2003 | Lavigne et al. | 370/428 |
| 2003/0198189 | A1 * | 10/2003 | Roberts et al. | 370/252 |
| 2004/0042456 | A1 * | 3/2004 | Dittmann et al. | 370/392 |

* cited by examiner

*Primary Examiner*—Seema S. Rao
*Assistant Examiner*—Jianye Wu
(74) *Attorney, Agent, or Firm*—Douglas W. Cameron; Anne Vachon Dougherty

(57) ABSTRACT

Described is a method and system for processing data packets of a data stream in a communication system. The data packets are processed depending on a feature of the header of a data packet in a faster path or in a slower path. To avoid a disorder by the different processing paths, the fast processed data packets are stored in a memory. The stored fast processed data packets are output after all slowly processed data packets which before the processing were in order before the fast data packets have been put to the output. In this way, the processed data packets are in the same order as prior to the processing.

1 Claim, 8 Drawing Sheets

Total length

METHOD FOR PRESERVING THE ORDER OF DATA PACKETS PROCESSED ALONG DIFFERENT PROCESSING PATHS

TECHNICAL FIELD

The present invention generally relates to data processing, and particularly realtes to processing of data packets in a data stream.

DESCRIPTION OF PRIOR ART

Data processing is performed in many different technical fields. One example of such a field is that of data communications from one host computer to another. Such communications are typically effected by a specialised data processing system known as a router. As will be appreciated from the following description, the present invention is of particular advantage in the field of routers for transmitting data packets which are sent via a wide area data communications network such as the Internet.

U.S. Pat. No. 6,247,060 B1 describes a system for protocol processing in a computer network having an intelligent network interface card or communication processing device associated with a host computer. The interface card provides a fast path that avoids protocol processing by the host processor for most packets, greatly accelerating data communication. The interface card also assists the host processor for those packets that are chosen for processing by host software layers. A communication control block for a message is defined that allows controllers of the interface card to move data, free of headers, directly to or from a destination or source in the host. The context is stored in the interface card as a communication control block that can be passed back to the host for message processing by the host. The interface card contains specialized hardware circuits that are much faster at performing their specific tasks than a general purpose central processing unit (CPU).

SUMMARY OF THE INVENTION

Packet processing on the host CPU represents a slow path. Each data packet comprises a header depending on whether the data packet is to be processed on a fast path or on a slow path.

An object of the present invention is to provide an improved method and system for processing data packets of a data stream in a data communication systems on a fast or a slow path depending on a feature of the data packet; rearranging the processed data packets after processing for attaining the correct order of the slow and fast processed data packets.

In accordance with the present invention, there is now provided a method for processing data packets of a data stream in a communication system, the method comprising: depending on a predetermined feature of a data packet, processing the data packet as one of a slow data packet on a slower path or a fast data packet on a faster path, wherein the data packet is processed faster in the faster path than in the slower path; reordering the data packets after the processing into the order they had prior to the processing; storing the fast data packets that were processed on the faster path in a memory after the processing if not all the slow data packets that before the processing were in order before the fast data packets and were processed on the slower path are received at an output; and, fetching the stored fast data packets from the memory and outputting to the output when all the slow data packets that before the processing were in order before the fast data packets are received at the output.

Viewing the present invention from another aspect, there is now provided a data processing system comprising an input connected to a distributing unit selectively connectable to an input of a slower processing unit and an input of a faster processing unit having an output connected to an input of a second distributing unit selectively connectable to a system output and a memory, wherein an output of the memory and an output of the slower processing unit are connected to the system output, wherein the first distributing unit, in use, checks a predetermined feature of a data packet and assigns the data packet to the slower or faster processing unit in dependence on the feature of the data packet, wherein the second distributing unit in use assigns the fast data packet that was processed by the faster processing unit to the memory if not all slow data packets that before the processing were in order before the fast data packet was processed and given to the system output, wherein the second distributing unit in use gives the processed fast data packets to the system output if all slow data packets that before the processing were in order before the fast data packet was processed and given to the system output, and wherein the second distributing unit in use gives the processed fast data packets to the system output after all in the memory stored fast data packets are drained out to the system output.

In a preferred embodiment of the present invention, data packets are assigned to a faster or slower path depending on a feature of the data packet. A fast data packet, which was processed on the faster path, is stored in a memory after processing if not all slow data packets, which before the processing were in order before the fast data packet, have already been processed and given out. A fast data packet is put out of the memory to an output if all the slow data packets, which before the processing were in order before the fast data packet, have already been processed and put out. This provides a correct order of the data packets independent of a slow or a fast processing of the data packets.

In a particularly preferred embodiment of the invention, a sync signal is produced if a slow data packet is followed by a fast data packet. The sync signal is put in the slower processing path. Once the sync signal has reached the head of the processing queue in the slower path and no other packets are being processed in the slower path anymore, a ready signal is generated. When the ready signal is generated, the stored fast processed data packets are given out. Using a sync signal which is processed in the slow path has the advantage that an in-time ready signal is provided which indicates that the last slow data packet has been processed and the fast processed data packets could be given out to get a data stream at the output with the same packet order as before the processing.

In a further embodiment of the invention, there is counting with a first number the slow data packets that are being queued for the slower processing path. At the output of the slower processing path, the processed slow data packets are counted with a second number. The first and the second numbers are compared and the faster processed data packets are given out of the memory if the first and second numbers are equal. Counting slow data packets provides a simple method for deciding at which time the data packets can be drained out of the memory for attaining an output data packet stream with the correct packet order.

A preferred example of a data processing system embodying the present invention has the property that there is a first distributing unit which checks features of a data packet and puts the data packet depending on the features to the slow or the fast path. Furthermore, there is a second distributing unit which distributes an already processed fast data packet to a memory or a system output. The fast data packet is stored in the memory if not all slow data packets, which before the processing were in order before the fast data packet, have already been processed and given out to the system output. The second distributing unit gives out the processed fast data packets to the system output if all slow data packets, which before the processing were in order before the fast data packet have already been processed and transmitted to the system output. The second distributing unit gives the processed fast data packets directly to the output after all stored fast data packets have been given out to the system output.

BRIEF DESCRIPTION OF THE DRAWINGS

Preferred embodiments of the present invention will now be described, by way of example only, with reference to the accompanying drawings, in which.

DETAILED DESCRIPTION OF THE INVENTION

Figure 1:
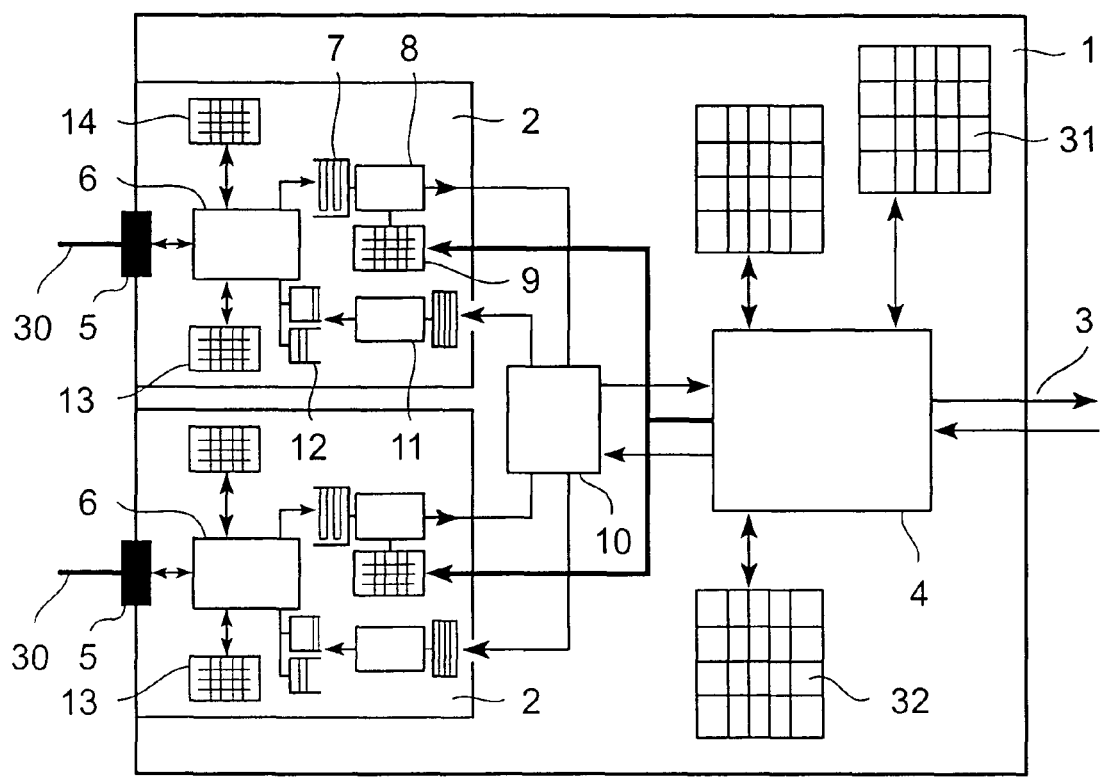
FIG. 1 is a block diagram of a router showing interfaces to a network and a control interface.

FIG. 1 shows a diagram of a router 1. A router is an intermediate system which operates up to the network layer of the OSI reference model. Routers may be used to connect two or more IP networks. A router comprises a computer system having plural network interfaces. The router receives data packets from each interface and forwards the received data packets to an appropriate output network interface.

The router uses information held in the network layer header to decide whether to forward a received packet and which network interface to use to send the packet. Packets are forwarded based on the packet's IP destination address, along with routing information held within the router in a routing table. A router comprises network interface cards 2. The network interface cards 2 are connectable to each other over a packet switch 10. The router 1 comprises a general purpose processor 4 which is in contact with the packet switch 10 and the two network interface cards 2. The general purpose processor is connected to a routing table 31 and a router management table 32. The routing table comprises information about other routers. The router management table is used for monitoring and control of the router.

In operation, the router forwards packets from one IP network to another IP network. The router determines the IP network from the IP address. In the simplest case, the processing of packets is implemented in the general purpose processor 4 which implements all the algorithms. More advanced routers may separate forwarding from routing and include a number of processors capable of performing this task.

The network interface card 2 comprises a media interface 5 for the physical layer, which is connected to a link protocol controller 6, for example Ethernet. The link protocol controller 6 is connected to a first FIFO memory 7, a queue memory 12, a hardware address table 13 and an interface management table 14. The first FIFO memory 7 is connected to a forwarding engine 8. The forwarding engine 8 is in contact with a forwarding table 9. The forwarding engine 8 is also connected via an interface to the packet switch 10. The network interface card 2 comprises an interface queue manager 11 which is connected to the queue memory 12 and to the interface of the packet switch 10.

Data packets which are received by the network interface card 2 over the cable 30 and the media interface 5 are processed by the link layer protocol controller 6, which handles the link layer protocol used over the cable. The link protocol controller 6 also checks the integrity of the received data packets by verifying their check sums valid frames are queued in the first FIFO memory which is a received queue. The first FIFO memory 7 may be in the form of a ring of memory buffers. The stored data packets are drained into an input of the forwarding engine 8. The forwarding engine 8 takes each packet, one at a time, and removes it from the first FIFO memory 7. The forwarding engine 8 then starts processing the network layer information. The forwarding engine 8 reads the network layer packet headers and checks various parts of the header to ensure the packet is not damaged or illegal. The forwarding engine 8 then uses the local forwarding table 9 to identify where in the network the packet should be routed to for deciding which output interface should be used. After identifying the appropriate output interface, the forwarding engine 8 then requests the packet switch 10 to form a connection to the appropriate output interface. The packet is then moved through the router to the output network interface controller.

At the output interface, the packet together with a link layer header is placed into a transmit queue 12 by the interface queue manager 11 until the link protocol controller 6 is ready to transmit the packet. The transmit queue 12 may also be in the form of a ring of memory buffers.

Each outgoing packet is assigned a new link layer destination address set to the next system to receive the packet. For finding this address, the link protocol controller 6 also maintains a hardware address table 13 associated with the interface. Furthermore, the link protocol controller 6 runs an address resolution protocol to find out the hardware addresses of other computers or routers connected to the same link-layer segment. The packet is finally sent using the media interface with the hardware address set to the next hop system.

If the forwarding engine 8 recognizes that the forwarding table 9 has a match for the IP destination address of the received packet which indicates that the packet should be sent out using one of the other interfaces on the same card, and the packet does not require any special IP processing, then the packet does not have to cross the packet switch. In this situation the forwarding engine 8 is directly connected to the interface queue manager 11. The interface queue manager 11 puts the data packet to the link output queue 12 which is connected to a link protocol controller 6. The link protocol controller 6 takes the data packet of the second queue memory 12 and sends it out over the network interface 5. This fast packet forwarding without using the general purpose processor 3 can significantly speed up the forwarding by avoiding the packet switch.

Depending on the way to deliver the data packet, the data packet may also be sent directly to another network interface card using a fast path without using the general purpose processor 3.

In the case of a router as explained with reference to FIG. 1, a slow path is used for data processing if the forwarding engine 8 recognises that further processing on the data, such as packet fragmentation, is necessary. In this case, the forwarding engine sends the data packets over the packet switch 10 to the general purpose processor 4. The general purpose processor 4 records the packets address in a memory and schedules a process to find out where the data packet is to be send to. The general purpose processor 4 checks whether the data packet contains any options for example packet fragmentation. If there are any options, then the general purpose processor 4 processes the options. After this, an IP destination address is extracted by the general purpose processor 4. If the data packet is for this router (IP destination address matches a router interface address), the data packet is forwarded to the appropriate task.

If the data packet is for a remote computer, the current forwarding table is searched to find the corresponding IP address. After finding the corresponding IP address, the corresponding output interfaces are determined. Also, the corresponding link layer address is determined by the general purpose processor 4. The general purpose processor 4 now knows where to send the data packet and which new link layer header is to be used. The general purpose processor 4 caches this information in the forwarding table 9. The general purpose processor 4 adds the link layer address to the packet and links the data packet into the list of frames to be sent on the appropriate interface using the packet switch 10.

In many cases, a plurality of data packets are sent by the same end system to the same destination IP address using the same data protocol. In this case, the data packets form a data flow. For this case, the first data packet is processed by the general purpose processor 4. The general purpose processor 4 checks the first data packet to obtain the destination to which the data flow is to be delivered. The following data packets are delivered to the same destination. The destination is stored in the cache and used for the following data packets of the data flow. The following data packets are processed directly by the forwarding engine 8 using the cached information (IP, destination address, port number, link address, and possibly other details). The forwarding engine 8 recognises that the following data packets are data packets of the same data flow and the data packets are directly forwarded by the forwarding engine 8 as explained above without using the general purpose processor 4. The direct forwarding involves faster processing than the forwarding over the general purpose processor 4. The following data packets can be directly handled by the fast data path if they do not have to be processed individually by the general purpose processor 4, for example, for handling Internet protocol options. The direct forwarding is a fast path and the forwarding over the general purpose processor 4 is a slow path.

A packet that is processed in a slower path usually takes more time to be processed than a packet in a faster path. Therefore, the problem may occur that a slow packet, which before the processing is in order before a fast packet, is delayed by processing in comparison to the fast packet.

For some applications, only a few packets of a flow need more complex processing that are preferably provided by a slow path while other packets of the flow can be handled by a fast path. A flow comprises, for example, all data packets with identical network addresses, transport protocol, and port numbers. If only some data packets of a flow are processed in a slow path, a hand over is desirable from the slow path to the fast path, or vice versa. Slow path processing is for example desirable for header compression or TCP splicing where connection set-up is too complex to be efficiently handled by a fast path. But once the set-up is complete, the remaining data packets of the flow can be processed by the fast path. If an error occurs, some packets may be sent to the processor again. The slow path is represented by the general purpose processor 3. A problem that occurs in this scenario is the following: when the processing of a data flow is switched from the slow path to the fast path there can still be packets of the data flow in the slow path. If now a new packet of the same flow arrives and is sent to the fast path then this new packet might overtake the remaining packets in the slow path, eventually leading to out of order delivery of packets. This is undesirable. Moreover, some applications depend on in order processing of packets in a flow. Header compression is an example of such an application. In this case, packets may be corrupted if reordered.

A preferred embodiment of the present invention seeks to prevent disordering of the packets due to processing some packets in the slow path and some packets in the fast path.

Figure 2:
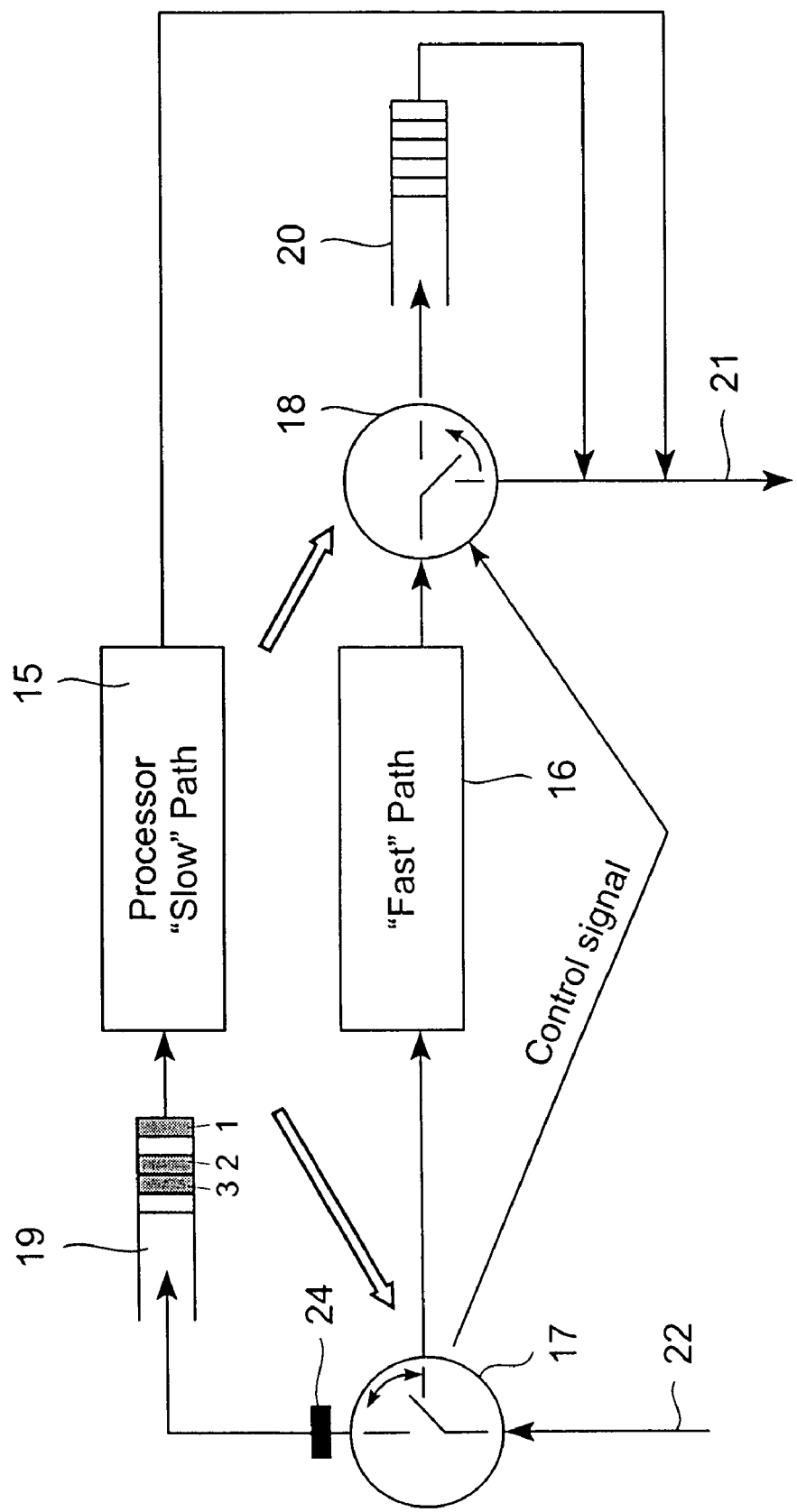
FIG. 2 is a block diagram of a packet processing system generating a sync signal.

FIG. 2 is a block diagram of fast and slow path processing 16, 15 for processing a slow data packet in the slow path 15 and for processing a fast data packet in the fast path 16. The fast path processing 16 is for example the fast packet forwarding explained earlier. The slow path processing 15 is for example the process forwarding explained earlier. A data stream of data packets is put in an input 22 connected to a first distributing unit 17. The first distributing unit 17 checks the header of the packet and decides based on the header of the packet whether the data packet is a fast data packet to be processed in the fast path 16 or a slow data packet to be processed in the slow path 15.

If the first distributing unit 17 recognises that the data packet is a slow packet, the first distributing unit 17 assigns the slow packet to a second queue memory 19 which is connected to the slow path 15. As it is shown in FIG. 2, there are three packets, numbered with 1, 2 and 3, assigned to the second queue memory 19. If the first distributing unit 17 detects after a slow packet a fast packet, then the first distributing unit 17 generates a sync signal 24 which is put in the second queue memory 19. The fast packet is assigned to the fast path 16 by the first distributing unit 17. The first distributing unit 17 gives out a control signal which is transmitted to a second distributing unit 18 connected to the output of the fast path 16. The second distributing unit 18 connects the output of the fast path 16 to a second FIFO memory 20 when it receives the control signal. The output of the second FIFO memory 20 is connected to a system output 21. Also, the output of the slow path 15 is connected to the system output 21.

Figure 3:
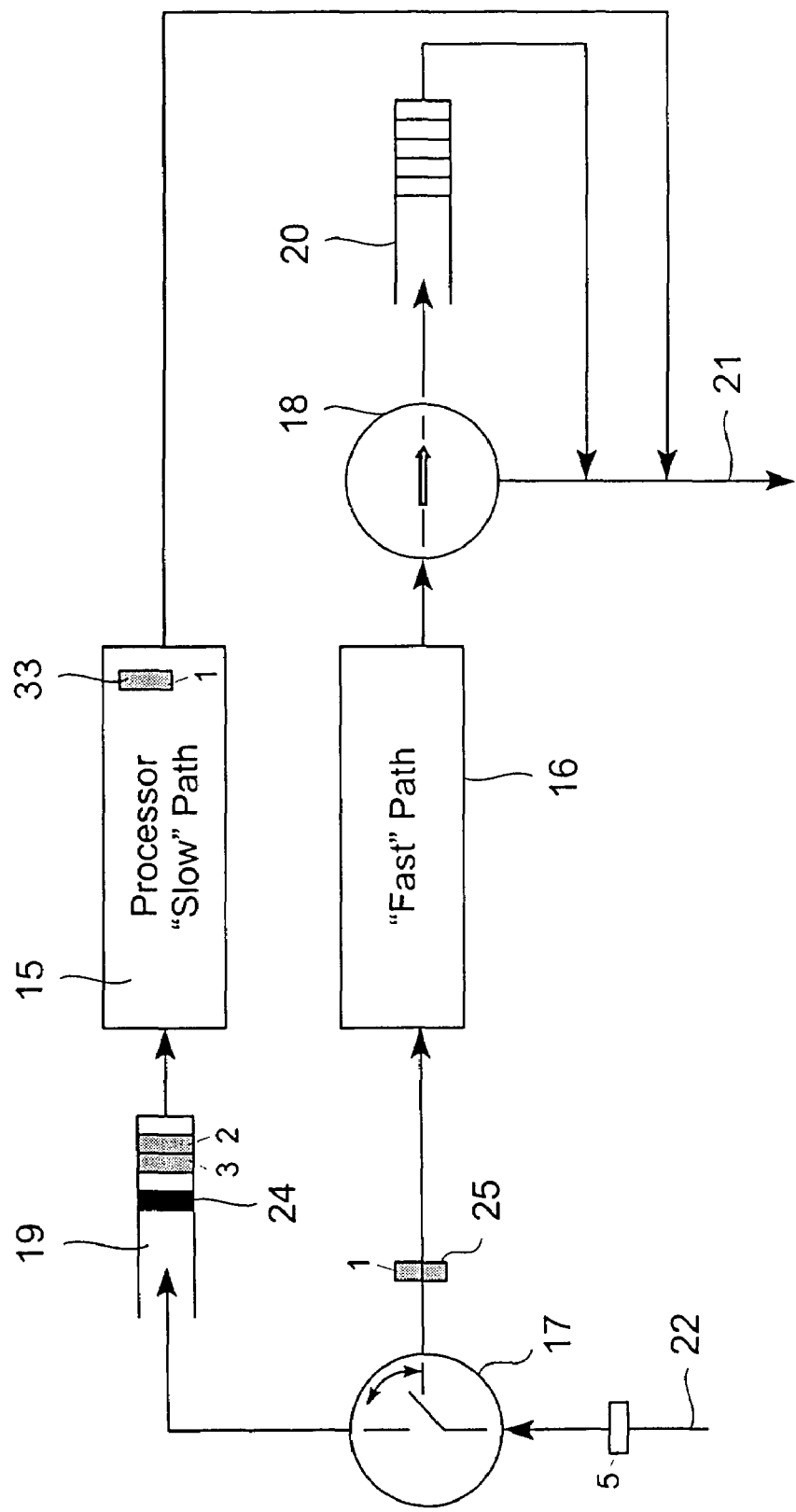
FIG. 3 is a block diagram of a packet processing system after generating a sync signal.

FIG. 3 shows a situation in which the sync signal 24 is in the second queue memory 19, along with packets 3 and 2. A first fast packet 25, numbered as 4, is assigned to the fast path 16. A first slow packet 33, numbered as 1, is processed in the slow processing path 15. A further packet, numbered as 5, is approaching the distributing unit 17.

Figure 4:
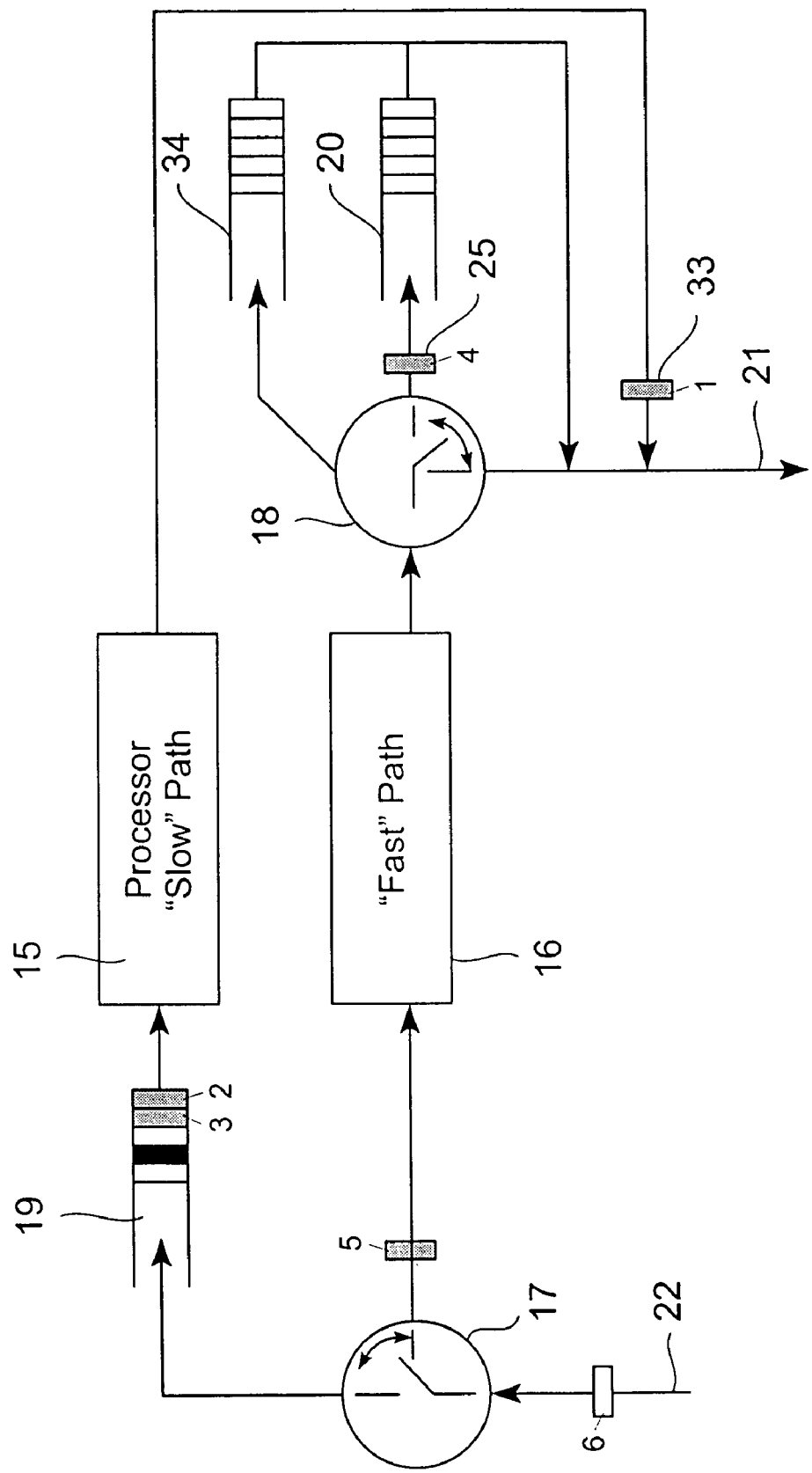
FIG. 4 is a block diagram of packet processing system in which a first processed fast data packet is stored in a memory.

FIG. 4 shows a situation in which the first slow packet 33 is output from the slow path 15 to the system output 21. Due to the faster processing in the fast path 16 at the same time, the first fast packet 25 is output by the fast path and distributed by the second distributing unit 18 to the second FIFO memory 20. The next fast packet, number 5, is assigned to the fast path 16 by the first distributing unit 17. A further packet, numbered as 6, is approaching the distributing unit 17.

Figure 5:
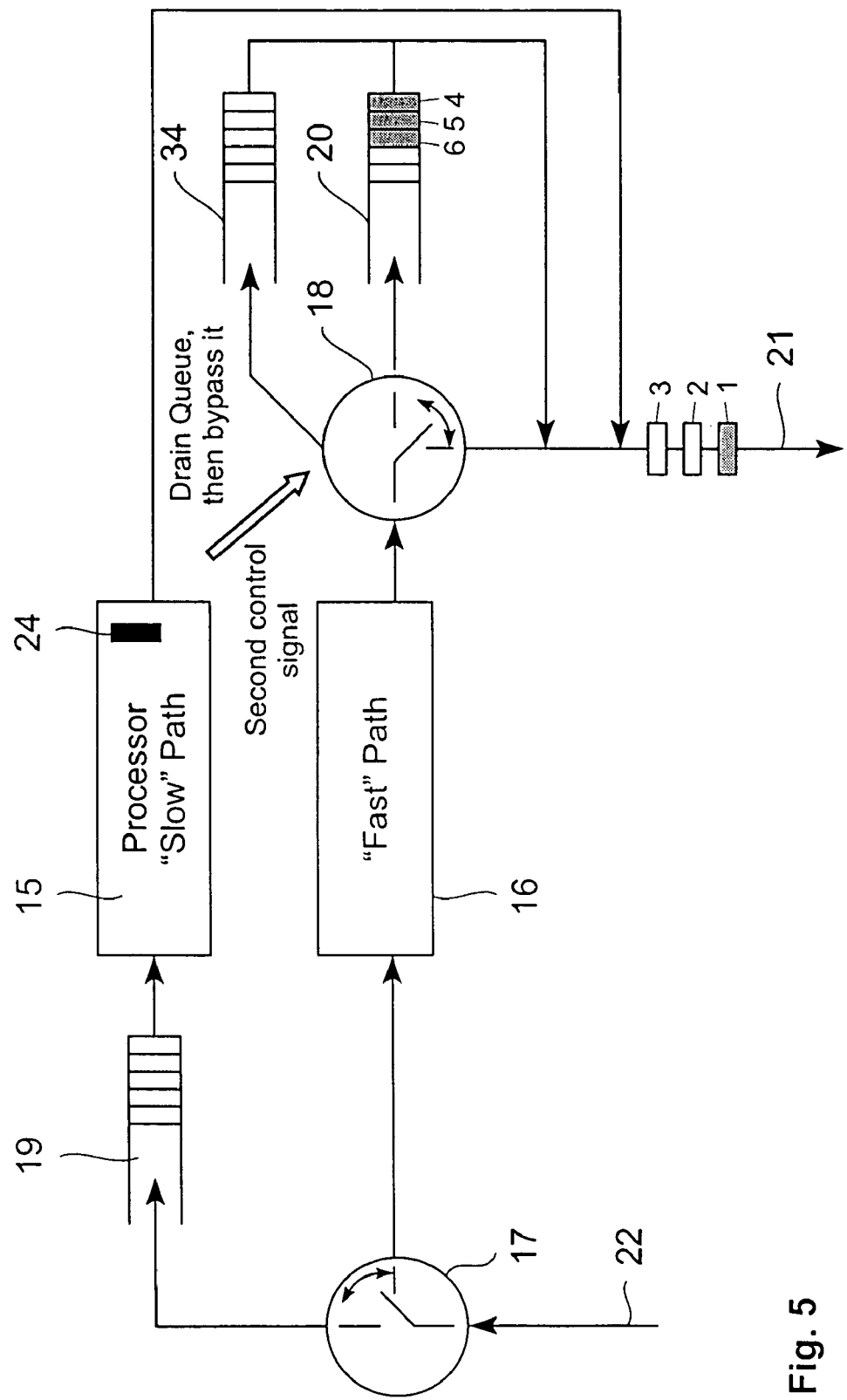
FIG. 5 is a block diagram of a packet processing system at the time the sync signal is being processed in the slow path.

FIG. 5 shows a situation in which all the slow packets, numbers 1, 2, and 3, have been processed and output to the system output 21. Fast packets, numbers 4, 5, and 6 are in the second memory 20. At this time, the sync signal 24 is processed in the slow path 15. Processing the sync signal, the slow path generates a second control signal which is given to the second distributing unit 18. The second control signal indicates to the second distributing unit 18 that the second FIFO memory 20 is to be drained to the system output 21. After draining fast packets 4, 5, and 6 out of the second memory 20 to the system output 21, the output of the fast path 16 is directly connected to the system output 21. Following fast packets are now given out to the system output 21 directly after processing in the fast path 16. In this way, the processed data packets show the same order as before the processing, independent of slower or faster processing.

In a preferred embodiment of the present invention, there are more second FIFO memories 20, 34. The second distributing unit 18 uses such a memory 20 for storing data packets of one data flow. If there are two data flows to be processed, the data flows are processed by the fast and slow paths 16,15 as explained above. If desirable, the processed fast data packets of the two data flows are stored in different second FIFO memories 20,34. The second distributing unit 18 checks the fast data packets and decides whether they belong to a first or second data flow and assigns the processed fast data packets to the corresponding second FIFO memory 20,34 if it is desired to hold the data packets of one flow in the correct order. The first and second data flows are independently processed from each other. The fast data packets of the first data flow are stored in the second FIFO memory 20, if desired as explained above. The fast data packets of the second data flow are stored in the further second FIFO memory 34 if desired in the same manner as the fast data packets of the first data flow. The stored fast data packets of the first and second data flows are given out to the system output 21 if all slow data packets of the first or respectively the second data flow that were before the processing in the order before the stored fast data packets were yet given out to the system output.

The slow and the fast path 15, 16 may be realised by one processor. Alternatively, the different paths 15, 16 may be processed by different processors. Also, the function of the first and second distributing units 17, 18 may be realised by one processor. The basic idea is not limited to the embodiments described herein but may also be realised in different embodiments.

Figure 6:
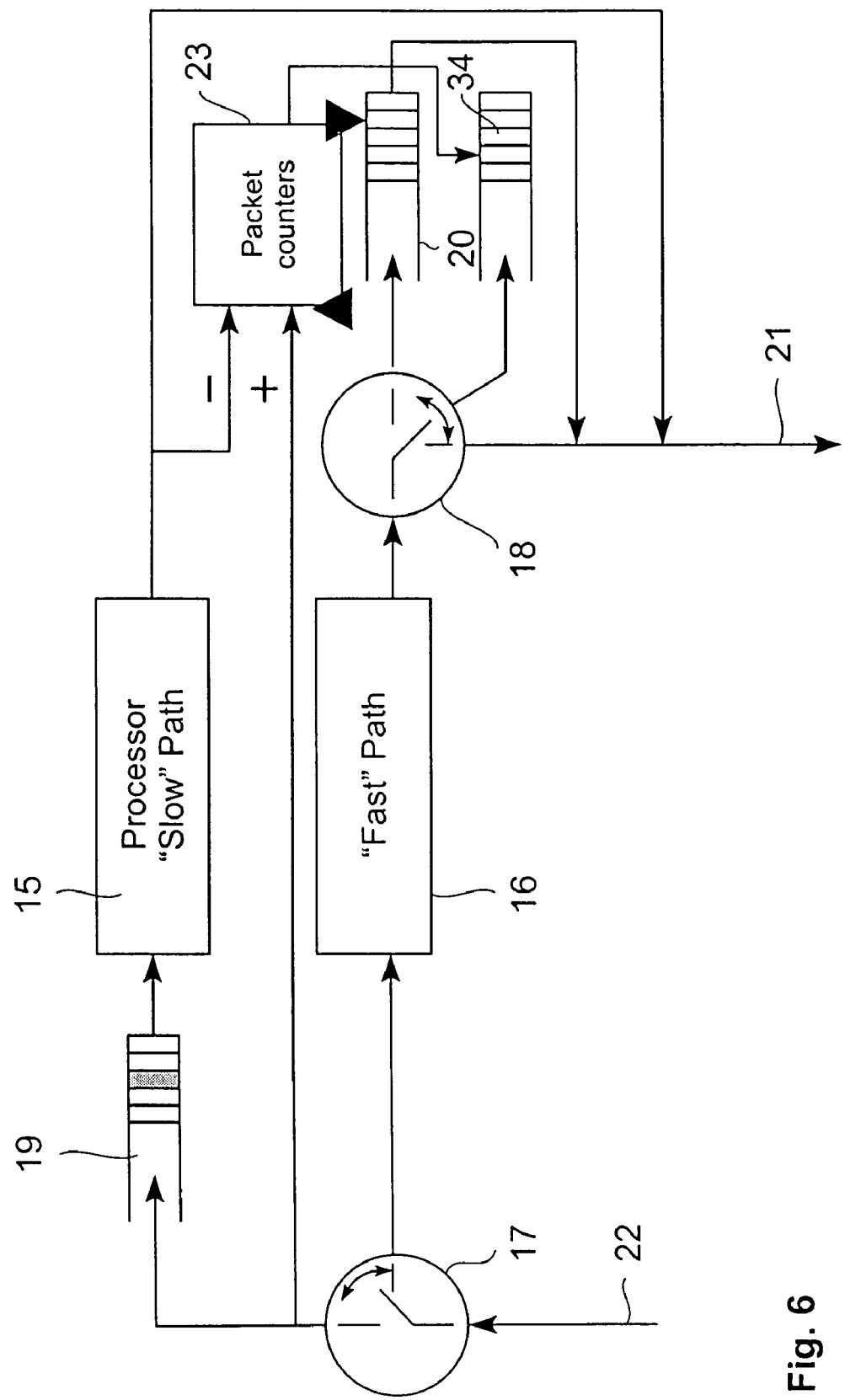
FIG. 6 is a block diagram of another embodiment of the invention with a packet counter which controls the second distributing unit and the memory of the fast data packets.

FIG. 6 shows another embodiment of the present invention that uses a packet counter 23 instead of a sync signal 24. The packet counter 23 is connected to the input of the second queue memory 19 and the output of the slow path 15. Furthermore, the packet counter 23 is connected to the second distributing unit 18 and the fourth FIFO memory 20 over control lines. The first and the second distributing unit 17, 18 function as explained herein with reference to FIGS. 2 to 5. The packet counter 23 increases the value of a first number if a slow data packet of a data flow is put to the second queue 19 of the slow path 15. Also, the packet counter 23 decreases the first number if a processed slow data packet of the same data flow is output by the slow path 15 to the system output 21. The packet counter 23 checks whether there is still a slow packet to be processed by the slow path 15 by checking the value of the first number. If the first number equals zero, all slow packets that were put into the slow path 15 have been output to the system output 21.

The packet counter 23 controls the second distributing unit 18 and the second FIFO memory 20. If the packet counter 23 detects that not yet all slow packets of a stream of data packets of a data flow have been processed and output by the slow path 15, then the packet counter 23 gives a control signal to the second distributing unit 18. The second distributing unit 18 connects its output after receiving the control signal with the input of the second FIFO memory 20.

If the packet counter 23 detects that all slow packets, that before the processing were in order before a fast packet, were yet processed by the slow path 15 and output to the system output 21, then the packet counter 23 gives a control signal to the second FIFO memory 20. The second FIFO memory 20 drains out the stored fast packets to the system output 21 after receiving the control signal. Then the packet counter 23 gives a control signal to the second distributing unit 18 to switch its output to the system output 21. As a result, the processed data packets show the same order as before the processing although some data packets were processed in the slow path and other data packets were processed in the fast path. The embodiment of FIG. 6 may be realised in one processor. Alternatively, the different functions, or the fast and the slow path, may also be distributed across several processors working together as shown in FIG. 6. If data flows are processed in parallel, then the packet counter 23 uses an individual number for every data flow. The data packets of the first data flow may be interleaved with the data packets of the second data flow. The data packets of the different data flows are processed independently from the data packets of the other data flow. Although a data flow comprises groups of slow data packets and groups of fast data packets, a separate number is assigned to each group to count the slow data packets of one group.

In a preferred embodiment of the invention, the packet counter 23 gets the number of slow data packets in the second queue 19 by the distributing unit 17 at the time fast data packets are detected by the first distributing unit 17. The packet counter 23 counts down the number if a slow data packet leaves the slow path 15. If the packet counter 23 detects that the number equals zero, then all slow data packets of this data stream were processed and transmitted to the system output. Eventually, the fast processed data packets stored in the second memory 20 are drained off to the system output 21.

In a preferred embodiment of the invention, there are further second FIFO memories 34 connected to the second distributing unit 18 and also controlled by the packet counter 23. The second distributing unit 18 puts the fast processed data packets of different flows in different second FIFO memories 20,34, if a storing of the fast data packets is desired for guaranteeing a correct order of the data packets within a flow. The packet counter 23 controls the draining and the filling up of the second FIFO memories 20,34 so that the correct order of the data packets within a flow is the same as before the processing.

The packet counter 23 checks whether the slow data packets of the first or the second data flow are all processed in the slow path and gives a signal to the corresponding second FIFO memory 20,34 to drain out the stored fast processed data packets of the corresponding data flow.

Embodiments of the present invention were explained herein based on a outer. However, the present invention is equally applicable to other data processing techniques in which slow and fast paths are employed in the processing of data packets. For such processes, it is advantageous to avoid out-of-order delivery of packets within a flow. By way of example, embodiments of the present invention may be applied to a host system for transferring messages from a local storage to a remote host, as shown in U.S. Pat. No. 6,247,060.

Figure 7:
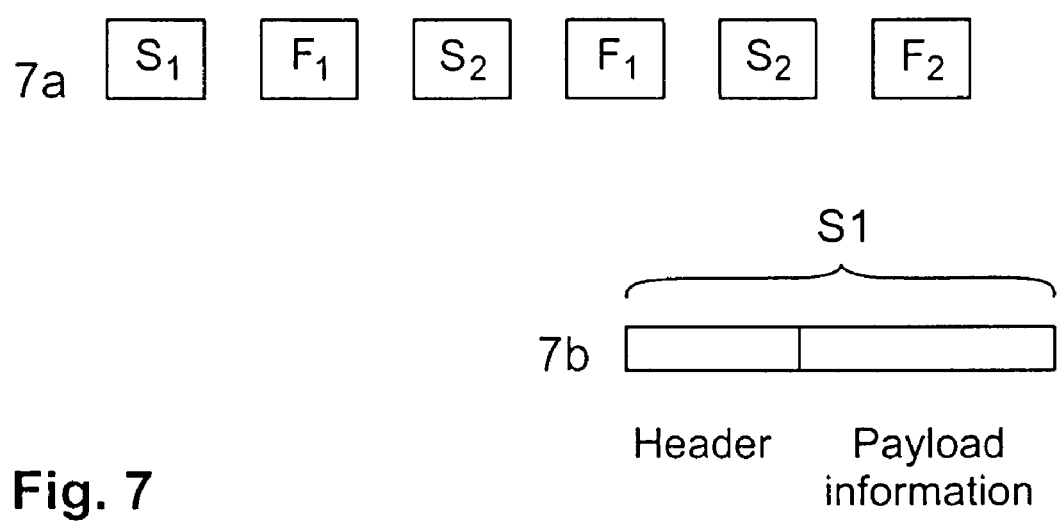
FIG. 7 shows a data stream.

FIG. 7 shows interleaved data packets of different data flows. Each data flow comprises data packets that may be fast packets F or slow packets S. A first data flow comprises fast and slow data packet $F_1$, $S_1$. A second data flow comprises fast and slow data packets $F_2$, $S_2$. A data packet comprises a header at the beginning that is followed by payload information. A data flow may be divided into several data packets if it is not possible to transmit the whole payload information of a data flow within one data package. This is typically the case where the Internet acts as the data transmission medium. In such circumstances, the data of a data flow is divided into different data packets that are transmitted using the Internet Protocol. Using the Internet, the method of data transmission is not determined and can be different for different data packets. At the destination address, it is usually necessary to process the data of a data flow in the order the data had prior to transmission via the Internet. Therefore, the data packets of a data flow should be reordered after transmission via the Internet. The header comprises information on features involved in the processing of the data packet and for transmitting the data packet.

Figure 8:
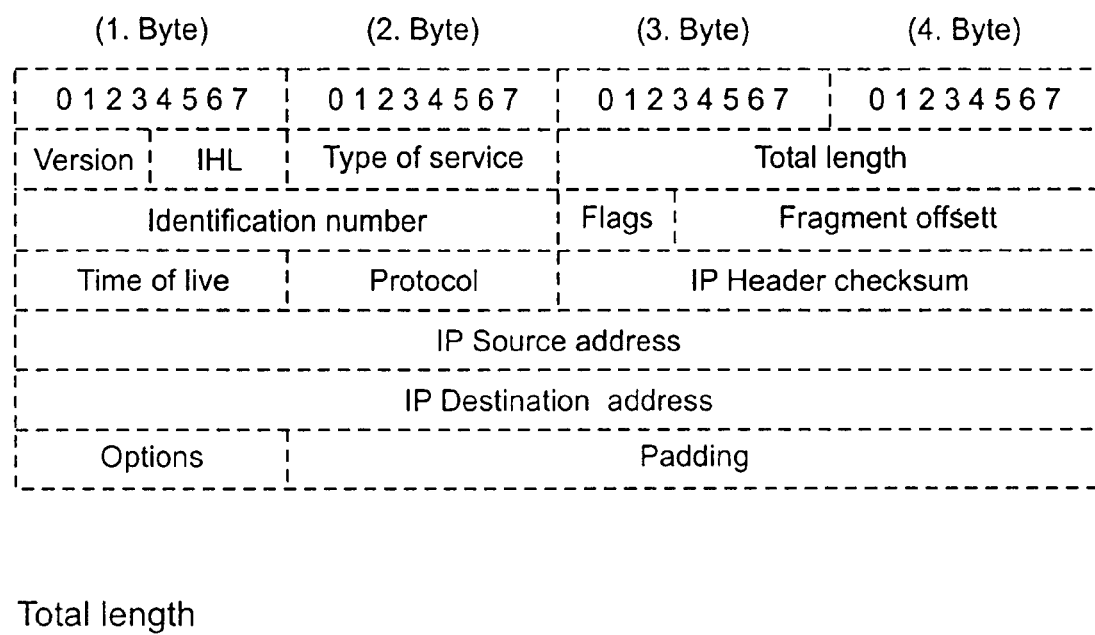
FIG. 8 shows an Internet Protocol header.

FIG. 8 shows an IP header of a data packet for transmission according to the Internet Protocol. All data packets of a data flow comprise the same source address, the same destination address, the same protocol and the same identification number. The identification number is used for reassembling the data packets of a data flow to one data packet. Specifically, the identification number identifies data packets for different data flows. If the processing order for the data packets of a data flow is to be obtained after transmitting the data packets, then the identification number may be used for reordering the data packets prior to processing. In a preferred embodiment of the present invention, this reordering is done before the first distributing unit 17.

The invention claimed is:

1. A method for processing data packets of a data stream in a communication system, the method comprising:
   depending on a predetermined feature of a data packet, said data packet being one of a plurality of data packets received in an original packet order, processing the data packet as one of a slow data packet on a slower path or a fast data packet on a faster path, wherein the data packet is processed faster in the faster path than in the slower path; and
   reordering the data packets after the processing into the original packet order;
   wherein the reordering comprises the steps of: for each fast processed fast data packet processed on the faster path, determining whether one or more slow data packet precede the fast data packet in the original packet order; determining whether said one or more slow data packets have been processed; and, if one or more slow data packets that preceded said fast data packet in said original packet order has not been processed, storing one or more fast processed fast data packets that were processed on the faster path in a memory until said one or more slow data packets have been processed and received at an output; and,
   fetching the stored one or more fast processed fast data packets from the memory for outputting to the output when all the slow data packets that preceded the one or more fast data packets in the original packet order have been received at the output;
   producing a sync signal if a last slow data packet is followed by a fast data packet;
   giving the sync signal to the slower processing path after the last slow data packet;
   generating a ready signal when the sync signal is processed in the slower path; and,
   in response to the ready signal, taking the stored fast processed data packets out of the memory and delivering further fast processed data packets to the output directly after the stored fast data packets have been drained out of the memory.

* * * * *